US012655878B2

(12) United States Patent (10) Patent No.: US 12,655,878 B2

Fujino (45) Date of Patent: Jun. 16, 2026

(54) POWER TRANSMISSION SYSTEM

(71) Applicant: ISUZU MOTORS LIMITED,
Yokohama (JP)

(72) Inventor: Ryusuke Fujino, Fujisawa (JP)

(73) Assignee: ISUZU MOTORS LIMITED,
Yokohama (JP)

( * ) Notice: Subject to any disclaimer, the term of this
patent is extended or adjusted under 35
U.S.C. 154(b) by 191 days.

(21) Appl. No.: 18/589,562

(22) Filed: Feb. 28, 2024

(65) Prior Publication Data

US 2024/0301923 A1      Sep. 12, 2024

(30) Foreign Application Priority Data

Mar. 9, 2023    (JP) ................................. 2023-036607

(51) Int. Cl.
| | |
|---|---|
| *F16D 27/112* | (2006.01) |
| *F16D 27/01* | (2006.01) |
| *F16F 15/14* | (2006.01) |
| *H02K 7/108* | (2006.01) |
| *F16D 127/02* | (2012.01) |
| *F16D 127/06* | (2012.01) |

(52) U.S. Cl.
CPC ............ *F16D 27/112* (2013.01); *F16D 27/01*
(2013.01); *F16F 15/14* (2013.01); *H02K*
*7/108* (2013.01); *F16D 2127/02* (2013.01);
*F16D 2127/06* (2013.01); *F16D 2500/1045*
(2013.01); *F16F 2222/08* (2013.01); *F16F*
*2232/02* (2013.01); *F16F 2236/08* (2013.01)

(58) Field of Classification Search
CPC .... F16D 27/112; F16D 27/01; F16D 2127/02;
F16D 2127/06; F16D 2500/1045; F16D 28/00; F16F 15/14; F16F 2222/08; F16F
2232/02; F16F 2236/08; H02K 7/108;
H02K 7/12; H02K 7/02; H02K 7/10
See application file for complete search history.

(56) References Cited

U.S. PATENT DOCUMENTS

| | | | |
|---|---|---|---|
| 4,233,521 A | 11/1980 | Pouget | |
| 2003/0097848 A1 | 5/2003 | Egami | |

(Continued)

FOREIGN PATENT DOCUMENTS

| | | |
|---|---|---|
| DE | 102009001014 A1 | 8/2010 |
| DE | 102015200166 A1 | 7/2016 |
| DE | 102017221103 A1 | 5/2019 |

(Continued)

*Primary Examiner* — Thomas Truong
(74) *Attorney, Agent, or Firm* — Shih IP Law Group,
PLLC

(57) ABSTRACT

A power transmission system including: a motor that
includes a rotor, and a stator provided outside the rotor and
movable in a rotation axis direction of the rotor; a moving
member that is connected to the stator and movable in the
rotation axis direction; a clutch that disables transmission of
power between the rotor and a power transmission member,
in conjunction with movement of the moving member; a
power source that applies a voltage to a coil wound around
the stator and the moving member, and an operation control
part that switches between a connected state where the
clutch transmits power and a disconnected state where the
clutch does not transmit power, by causing the power source
to apply a voltage to the coil to move the stator in the
rotation axis direction of the rotor.

9 Claims, 5 Drawing Sheets

(56) References Cited

U.S. PATENT DOCUMENTS

2007/0220874 A1 * 9/2007 Hemphill .............. F16H 41/24
60/341
2011/0291503 A1 12/2011 Wolf et al.

FOREIGN PATENT DOCUMENTS

| | | | |
|----|----|----|----|
| JP | S53-55725 | A | 5/1978 |
| JP | S53-109043 | A | 9/1978 |
| JP | S56-112851 | A | 9/1981 |
| JP | S56-132142 | A | 10/1981 |
| JP | S58184741 | U | 10/1983 |
| JP | S58-186770 | U | 12/1983 |
| JP | 2003-120765 | A | 4/2003 |
| JP | 2003-165330 | A | 6/2003 |
| WO | WO-2012006522 A2 * | 1/2012 | .............. H02K 7/10 |

* cited by examiner

POWER TRANSMISSION SYSTEM

CROSS-REFERENCE TO RELATED APPLICATIONS

The present application claims priority to the Japanese Patent Application number 2023-36607, filed on Mar. 9, 2023, contents of which are incorporated herein by reference in their entirety.

BACKGROUND OF THE INVENTION

The present disclosure relates to a power transmission system that transmits power of a motor. Systems that transmit power have been known. Japanese Unexamined Utility Model Application Publication No. 58-184741 discloses a power transmission system in which a solenoid coil wound around an iron core is excited to adsorb a plunger connected to a shift lever to the solenoid coil, whereby the shift lever is rotated about a fulcrum pin, and a clutch connected to the shift lever is operated to switch whether or not to transmit power.

In conventional technologies, space for disposing the shift lever and the plunger, space for the plunger to move, space for rotating the shift lever around the fulcrum pin, and the like are required, and consequently power transmission systems become larger.

BRIEF SUMMARY OF THE INVENTION

The present disclosure focuses on this point, and its object is to downsize a power transmission system that transmits power.

An aspect of the present disclosure provides a power transmission system including: a motor including a rotor and a stator provided outside the rotor; a clutch that disables transmission of power between the rotor and a power transmission member to which rotational force of the motor is transmitted; and an operation control part that switches between (i) a connected state where the clutch transmits power and (ii) a disconnected state where the clutch does not transmit power, by moving the stator in a rotation axis direction of the rotor.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Configuration of a Power Transmission System S According to a First Embodiment

Figure 1:
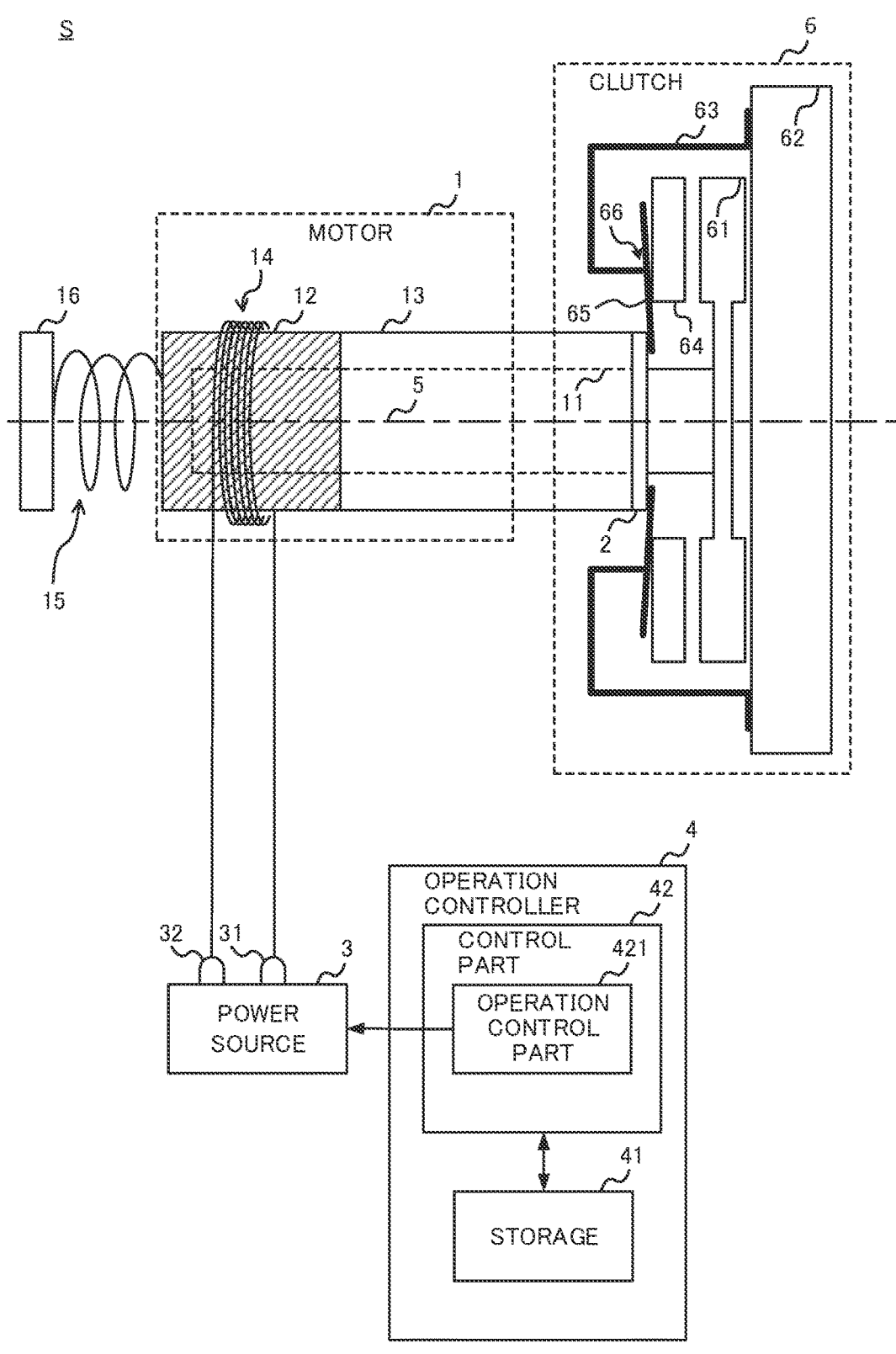
FIG. 1 is a diagram illustrating a configuration of a power transmission system according to a first embodiment.
Figure 2:
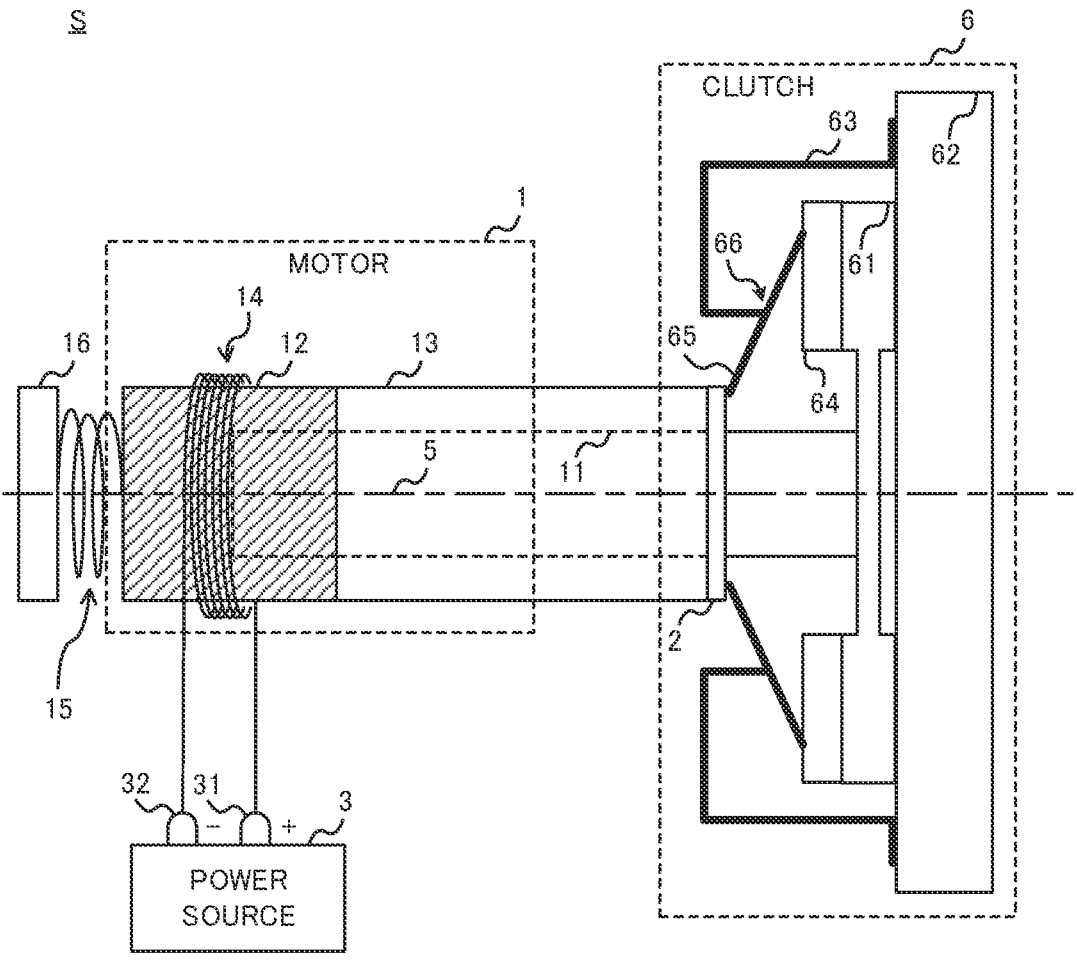
FIG. 2 is a schematic view showing a state in which the transmission of power is enabled.

FIGS. 1 and 2 are each a diagram for illustrating a configuration of a power transmission system S according to a first embodiment. The power transmission system S is mounted in a vehicle including a motor 1. The power transmission system S includes the motor 1, a power source 3, an operation controller 4, and a clutch 6.

The power transmission system S enables and disables the transmission of power between the motor 1 and a power transmission member to which rotational force of the motor 1 is transmitted. The power transmission member is a pulley connected to a wheel, for example, but may be another power transmission member such as a gear or a shaft. In FIG. 1, the transmission of power is disabled between the motor 1 and the power transmission member. In FIG. 2, the transmission of power is enabled between the motor 1 and the power transmission member.

The motor 1 is an inner-rotor type motor in which a rotor 11 disposed inside a stator 12 rotates. The rotor 11 has a cylindrical shape. The rotor 11 is connected to a clutch disc 61 of the clutch 6. The stator 12 is provided on the outside of the rotor 11. The stator 12 is provided such that it can move in a direction of a rotation axis 5 of the rotor 11. The stator 12 has a cylindrical shape, for example.

A moving member 13 is connected to the stator 12. The moving member 13 is movable in the direction of the rotation axis 5 together with the stator 12. The moving member 13 is provided on the same side as the clutch 6 when viewed from the stator 12 in the direction of the rotation axis 5. The moving member 13 has a cylindrical shape, for example. A specific example of the moving member 13 is a pipe, but the present disclosure is not limited thereto. The length of the moving member 13 in the direction of rotation axis 5 is shorter than the length of the rotor 11 in the direction of rotation axis 5. That is, the rotor 11 passes through the moving member 13.

The clutch 6 is connected to the moving member 13 via a bearing 2. The clutch 6 enables and disables the transmission of power between the rotor 11 and the power transmission member, to which the rotational force of the motor 1 is transmitted, in conjunction with movement of the moving member 13 in the direction of the rotation axis 5. The clutch 6 is a friction clutch, for example. Specifically, the clutch 6 is a diaphragm spring clutch, but is not limited thereto.

The clutch 6 includes a clutch disc 61, a flywheel 62, a clutch cover 63, a pressure plate 64, and a diaphragm spring 65. The clutch disc 61 is connected to the rotor 11 and rotates in conjunction with the rotation of the rotor 11. The flywheel 62 is connected to the power transmission member. The clutch cover 63 is provided on the flywheel 62. The diaphragm spring 65 is an elastic member formed of a disc-shaped plate having a hole in the center, wherein the plate is conically shaped. The diaphragm spring 65 contacts the clutch cover 63 at a contact point 66. The bearing 2 is provided between the diaphragm spring 65 and the moving member 13. Details of an operation in which the clutch 6 disables the transmission of power in conjunction with the movement of the moving member 13 in the direction of the rotation axis 5 will be described later.

The coil 14 is wound around an outer peripheral surface of the stator 12. The coil 14 may be wound around an outer peripheral surface of the moving member 13, or may be wound around the outer peripheral surfaces of both the stator 12 and the moving member 13. The coil 14 is an insulated wire in which a conductor is covered with an insulator, for example.

The elastic member 15 is provided opposite to the moving member 13 in the direction of the rotation axis 5 when viewed from the stator 12. One end of the elastic member 15 is connected to a plate 16. The other end, which is different from said one end, of the elastic member 15 is connected to the stator 12. In other words, the elastic member 15 is provided between the stator 12 and the plate 16. The elastic member 15 is configured with an elastic body which deforms when a stress is applied and returns to its original shape when the stress is removed. The elastic member 15 is a compression spring, for example, but is not limited thereto.

The elastic member 15 applies a force to the stator 12 and the moving member 13 in the direction of the rotation axis 5. The elastic member 15 applies a force to the stator 12 and the moving member 13 in a first direction (a direction from the left to the right in FIG. 1 and FIG. 2) by which the stator 12 and the moving member 13 are brought closer to the clutch 6 in the direction of the rotation axis 5. The elastic member 15 puts the clutch 6 into a disconnected state by applying the force in the first direction. The following explains how the elastic member 15 transitions the clutch 6 from a connected state, where the clutch 6 transmits power between the power transmission member and the rotor 11, to the disconnected state, where the clutch 6 does not transmit power.

In the state where the transmission of power is enabled, the diaphragm spring 65 is applying a force to the pressure plate 64 (see FIG. 2). The pressure plate 64 applies a force to the clutch disc 61 when the force is applied from the diaphragm spring 65. When the force is applied from the pressure plate 64, the clutch disc 61 is pressed against flywheel 62 and comes into contact with the flywheel 62. When the clutch disc 61 and the flywheel 62 come into contact with each other, the flywheel 62 rotates in conjunction with the clutch disc 61 due to friction, and the power is transmitted between the power transmission member and the rotor 11.

The elastic member 15 applies a force to the moving member 13 in the direction of the rotation axis 5 and brings the moving member 13 close to the clutch 6 by moving the moving member 13 in the first direction. The moving member 13 applies, to the diaphragm spring 65, a force in the first direction that brings the diaphragm spring 65 closer to the clutch disc 61. When the force in the first direction is applied from the moving member 13, this causes the diaphragm spring 65 to warp with the contact point 66 as a fulcrum, at which the diaphragm spring 65 contacts the clutch cover 63 (see FIG. 1). When the diaphragm spring 65 is warped, the force in the first direction from the diaphragm spring 65 ceases to be applied to the pressure plate 64. When the force in the first direction from the pressure plate 64 ceases to be applied, the clutch disc 61 disengages from the flywheel 62. When the clutch disc 61 is disengaged from the flywheel 62, the flywheel 62 ceases to rotate even when the clutch disc 61 rotates. In this way, by applying the force in the first direction, which brings the stator 12 and the moving member 13 closer to the clutch 6, to the stator 12 and the moving member 13, the elastic member 15 puts the clutch 6 into the disconnected state where the clutch 6 does not transmit the power between the power transmission member and the rotor 11.

The power source 3 applies a voltage to the coil 14. The power source 3 can supply a current to the coil 14 by applying the voltage to the coil 14. For example, the power source 3 applies to the coil 14 a voltage by which a first terminal 31 becomes the positive electrode (+) and a second terminal 32 becomes the negative electrode (−). By inverting the polarity of the voltage, the power source 3 can also apply a voltage to the coil 14 by which the first terminal 31 becomes the negative electrode (−) and the second terminal 32 becomes the positive electrode (+).

The operation controller 4 includes a storage 41 and a control part 42. The storage 41 includes storage media such as a ROM (Read Only Memory), a RAM (Random Access Memory), a hard disk, and the like. The storage 41 stores a program executed by the control part 42.

The control part 42 is a calculation resource including a processor such as a CPU (Central Processing Unit). By executing the program stored in the storage 41, the control part 42 functions as the operation control part 421.

The operation control part 421 switches between (i) the connected (enabled) state, where the clutch 6 transmits the power between the power transmission member and the rotor 11, and (ii) the disconnected (disabled) state, where the clutch 6 does not transmit the power between the power transmission member and the rotor 11. For example, the operation control part 421 moves the stator 12 in a rotation axis direction of the rotor 11 by causing the power source 3 to apply the voltage to the coil 14, thereby bringing the clutch 6 into the connected state. Specifically, the operation control part 421 brings the clutch 6 into the connected state by changing a position of the stator 12 in the rotation axis direction of the rotor 11. The operation control part 421 causes the power source 3 to apply, to the coil 14, the voltage by which the first terminal 31 becomes the positive electrode and the second terminal 32 becomes the negative electrode, thereby causing the stator 12 and the moving member 13 to generate a force (Lorentz force) which is greater than the force applied to the stator 12 and the moving member 13 by the elastic member 15. More specifically, by causing the stator 12 and the moving member 13 to generate the Lorentz force, the operation control part 421 moves the stator 12 and the moving member 13 in a second direction (a direction from right to left in the drawing), by which the stator 12 and the moving member 13 move away from the clutch 6 in the direction of the rotation axis 5.

When the moving member 13 is moved in the direction away from the clutch 6, the clutch 6 enables the transmission of power between the power transmission member and the rotor 11 in conjunction with the movement of the moving member 13 in the direction of the rotation axis 5. Specifically, when the moving member 13 is moved in the second direction in the direction of the rotation axis 5, the force in the first direction from the moving member 13 ceases to be applied to the diaphragm spring 65.

When the force in the first direction from the moving member 13 ceases to be applied, the diaphragm spring 65 applies a force in the first direction to the pressure plate 64. When the force in the first direction from the diaphragm spring 65 is applied, the pressure plate 64 applies the force in the first direction to the clutch disc 61. By having the force in the first direction applied from the pressure plate 64, the clutch disc 61 moves in the first direction approaching the flywheel 62 in the direction of the rotation axis 5. That is, the clutch disc 61 contacts the flywheel 62 by having the force in the first direction applied from the diaphragm spring 65 and the pressure plate 64. The rotor 11 connected to the clutch disc 61 moves in the first direction approaching the flywheel 62 in the direction of the rotation axis 5 in conjunction with movement of the clutch disc 61.

The operation control part 421 may generate magnetic force as a force for moving the stator 12 and the moving member 13. In this case, the plate 16 is formed of permanent magnets. The moving member 13 is formed of magnetic materials other than a magnet. By causing the power source 3 to apply the voltage to the coil 14, the operation control part 421 causes the moving member 13 to function as the magnet. Specifically, by causing the power source 3 to apply the voltage to the coil 14, the operation control part 421 turns the moving member 13 into an electromagnet that generates a magnetic adsorption force by which the moving member 13 is adsorbed to the plate 16. In other words, the moving member 13 becomes the electromagnet that generates the magnetic adsorption force to adsorb the plate 16. By turning the moving member 13 into the electromagnet, the operation control part 421 causes the stator 12 and the moving member 13 to move in a direction in which the stator 12 and the moving member 13 approach the plate 16. Since the stator 12 and the moving member 13 are moved in the direction toward the plate 16, the clutch 6 is put into the connected state where the power between the power transmission member and the rotor 11 is transmitted.

The operation control part 421 may put the clutch 6 into the connected state in a case where a rotational speed difference between the rotational speed of the clutch disc 61 and the rotational speed of the flywheel 62 is equal to or less than a predetermined value. In this case, the operation control part 421 acquires the rotational speed from a sensor that detects the rotational speed of the clutch disc 61 and the rotational speed from a sensor that detects the rotational speed of the flywheel 62. The predetermined value may be determined as appropriate through experiments or the like so that impacts at the time of causing the clutch 6 to enable the transmission of power is within an allowable range. For example, in a case where the rotational speed of the clutch disc 61 and the rotational speed of the flywheel 62 are zero while the vehicle is stopped, the operation control part 421 puts the clutch 6 into the connected state by causing the power source 3 to apply the voltage to the coil 14. After putting the clutch 6 in the connected state, the operation control part 421 starts the motor 1. In this way, the operation control part 421 can reduce impacts at the time of putting the clutch 6 into the connected state.

In a case where the rotational speed difference is greater than the predetermined value, the operation control part 421 controls the motor 1 so as to make the rotational speed difference equal to or less than the predetermined value. For example, the operation control part 421 makes the rotational speed difference equal to or less than the predetermined value by changing the rotational speed of the rotor 11 of the motor 1 such that the rotational speed of the clutch disc 61 approaches the rotational speed of the flywheel 62. The operation control part 421 causes the power source 3 to apply the voltage to the coil 14 after the rotational speed difference has become equal to or less than the predetermined value. By doing this, even when power of the motor 1 is used while the vehicle is traveling, the operation control part 421 can reduce impacts at the time of putting the clutch 6 into the connected state.

In a case where the clutch 6 is put into the connected state, the operation control part 421 causes the power source 3 to continue to apply to the coil 14 the voltage by which the first terminal 31 becomes the positive electrode and the second terminal 32 becomes the negative electrode. In other words, by causing the power source 3 to continuously apply, to the coil 14, the voltage by which the first terminal 31 becomes the positive electrode and the second terminal 32 becomes the negative electrode, the operation control part 421 keeps the clutch 6 in the connected state.

When putting the clutch 6 into the disconnected state, the operation control part 421 causes the power source 3 not to apply any voltage to the coil 14. In a case where the power source 3 does not apply any voltage to the coil 14, the stator 12 and the moving member 13 move in a direction away from the plate 16 and approaching the diaphragm spring 65, due to the force applied by the elastic member 15. Since the stator 12 and the moving member 13 move in the direction approaching the diaphragm spring 65, the force from the moving member 13 is applied to the diaphragm spring 65, and this causes the diaphragm spring 65 to warp with the contact point 66 as a fulcrum, at which the diaphragm spring 65 contacts the clutch cover 63. When the diaphragm spring 65 is warped with the contact point 66 as the fulcrum, the force ceases to be applied to the clutch disc 61, and the clutch disc 61 and the flywheel 62 do not contact each other. When the clutch disc 61 and the flywheel 62 are not in contact with each other, the flywheel 62 ceases to rotate even when the clutch disc 61 rotates, and therefore the power between the power transmission member and the rotor 11 is not transmitted.

In this manner, by moving the moving member 13 by causing the power source 3 to switch between whether or not to apply the voltage to the coil 14, the operation control part 421 switches between the connected state and the disconnected state of the clutch 6, which interlocks with movement of the moving member 13. By doing this, space for disposing the shift lever and the plunger, space for the plunger to move, space for rotating the shift lever around the fulcrum pin, and the like are no longer required in the power transmission system S. As a result, the space required for the configuration of the power transmission system S that transmits power can be reduced, and therefore the power transmission system S can be downsized.

Figure 3:
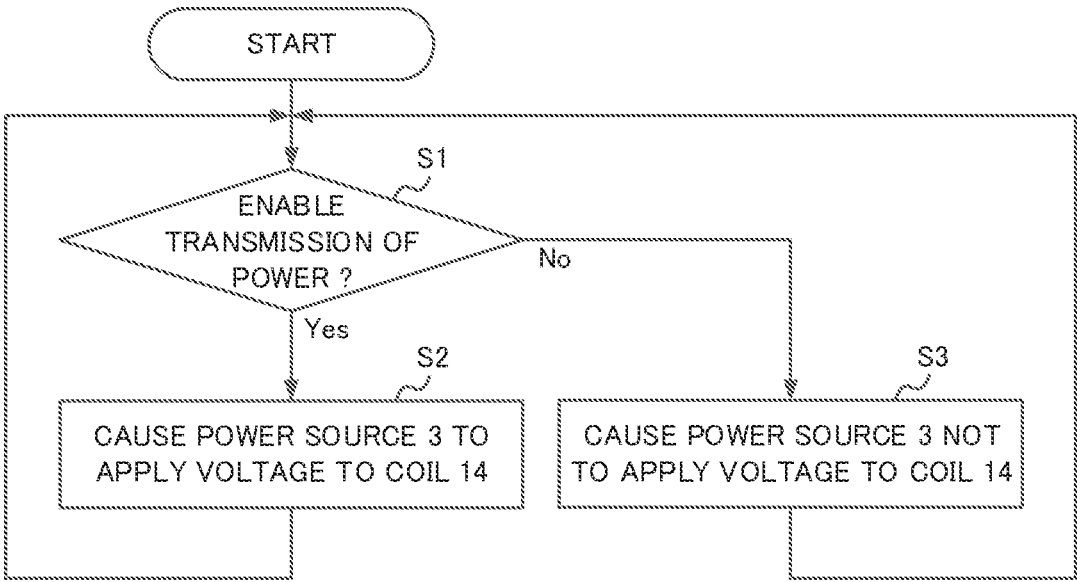
FIG. 3 is a flowchart showing an example of a process executed by an operation controller.

Process Executed by the Operation Controller 4 According to the First Embodiment FIG. 3 is a flowchart showing an example of a process executed by the operation controller 4. The process shown in the flowchart of FIG. 3 is repeatedly executed while a vehicle equipped with the power transmission system S is in operation.

The operation control part 421 determines whether or not to put the clutch 6 into the connected state (step S1). For example, if an instruction to put the clutch 6 into the connected state is received from an ECU (Electronic Control Unit) that controls the vehicle in which the power transmission system S is mounted, the operation control part 421 determines that the clutch 6 is to be put into the connected state. If an instruction to put the clutch 6 into the disconnected state is received from the ECU, the operation control part 421 determines that the clutch 6 is to be put into the disconnected state.

When putting the clutch 6 into the connected state (Yes in step S1), the operation control part 421 causes the power source 3 to apply a voltage to the coil 14 (step S2). The operation control part 421 causes the power source 3 to continue to apply to the coil 14 a voltage by which the first terminal 31 becomes the positive electrode and the second terminal 32 becomes the negative electrode, during a period from receiving the instruction to put the clutch 6 into the connected state until receiving the instruction to put the clutch 6 into the disconnected state. While the power source 3 is applying the voltage to the coil 14, the clutch 6 is kept in the connected state in which the transmission of power is enabled.

If the instruction to put the clutch 6 in the disconnected state is received (No in step S1), the operation control part 421 causes the power source 3 not to apply any voltage to the coil 14 (step S3). In a case where the operation control part 421 is causing the power source 3 to apply the voltage when the instruction to put the clutch 6 in the disconnected state is received, the operation control part 421 causes the power source 3 to stop the application of the voltage to the coil 14. In a case where the power source 3 is not applying any voltage to the coil 14, the diaphragm spring 65 applies a force to the moving member 13, and therefore the clutch 6 is kept in the disconnected state in which the transmission of power is disabled.

Figure 4:
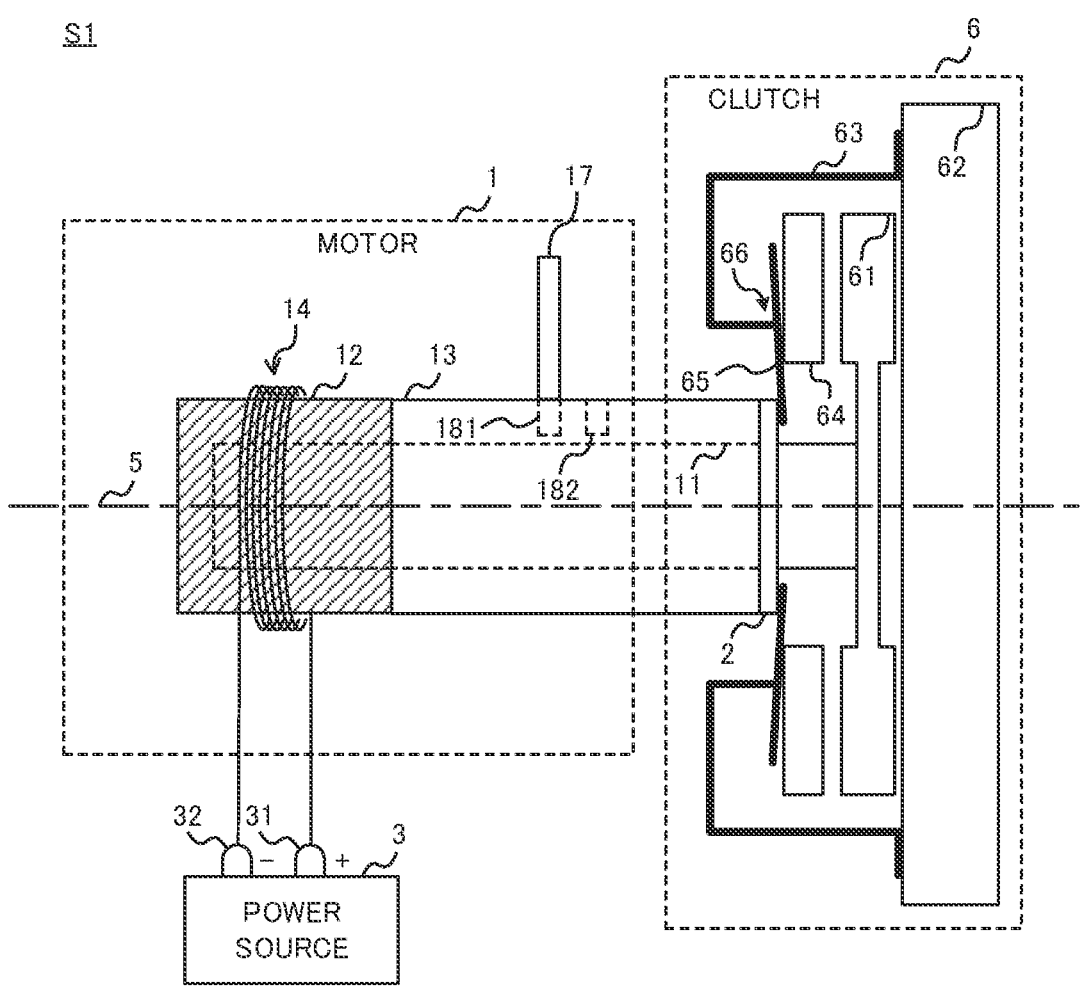
FIG. 4 is a diagram illustrating a configuration of a power transmission system according to a second embodiment.
Figure 5:
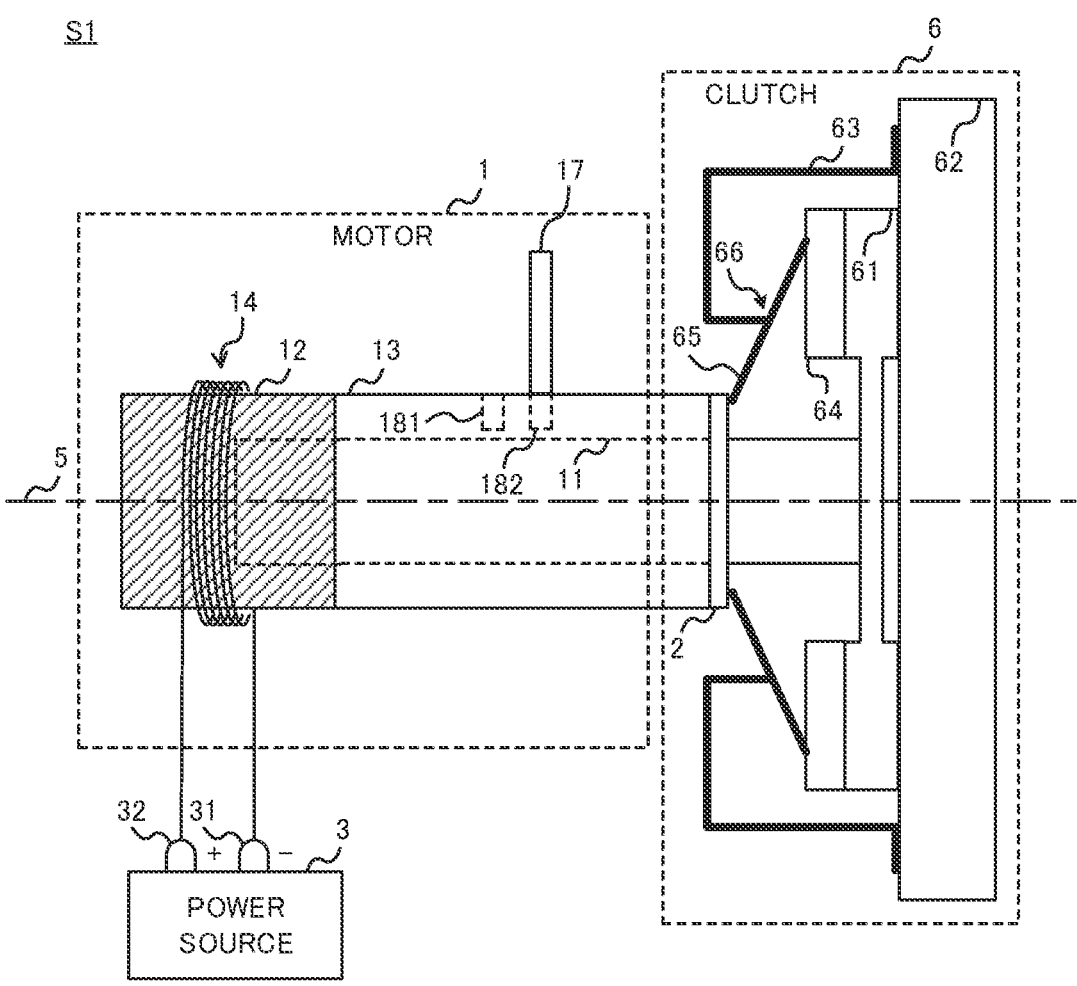
FIG. 5 is a schematic view showing a state in which the transmission of power is enabled.

Configuration of a Power Transmission System S1 According to the Second Embodiment FIGS. 4 and 5 are each a diagram for explaining a configuration of a power transmission system S1 according to the second embodiment. In FIG. 4, the transmission of power between the motor 1 and the power transmission member is disabled, and the transmission of power is enabled in FIG. 5. Unlike the power transmission system S according to the first embodiment, the power transmission system S1 includes a holding member 17, instead of the elastic member 15 and the plate 16. Further, the moving member 13 includes a first hole 181 and a second hole 182 into which the holding member 17 is inserted.

The holding member 17 holds the stator 12 and the moving member 13, which assume predetermined states by being inserted into the first hole 181 or the second hole 182. The operation control part 421 controls an actuator (not shown) to move the holding member 17 in a direction perpendicular to the rotation axis 5 (vertical direction in the drawing), thereby pulling out the holding member 17 from the first hole 181 or the second hole 182, or inserting the holding member 17 into the first hole 181 or the second hole 182. The holding member 17 is provided such that it moves in the direction perpendicular to the rotation axis 5 and does not move in a direction parallel to the rotation axis 5.

Since the holding member 17 is inserted into the first hole 181 by the operation control part 421, the clutch 6 is kept in the disconnected state. As shown in FIG. 4, since the holding member 17 is inserted into the first hole 181, the moving member 13 becomes unable to move in the direction of the rotation axis 5. As a result, the clutch 6 is kept in the disconnected state.

The operation control part 421 pulls out the holding member 17 from the first hole 181 when switching the state of the clutch 6 from the disconnected state to the connected state. Specifically, the operation control part 421 pulls out the holding member 17 from the first hole 181 by controlling the actuator to move the holding member 17 inserted in the first hole 181 in a direction away from the moving member 13.

After pulling out the holding member 17 from the first hole 181, the operation control part 421 causes the power source 3 to apply a first voltage to the coil 14, thereby causing the stator 12 and the moving member 13 to generate the Lorentz force that moves the stator 12 and the moving member 13 such that the clutch 6 is put into the connected state. Specifically, the operation control part 421 causes the stator 12 and the moving member 13 to generate the Lorentz force that moves the moving member 13 in a direction away from the clutch 6, by causing the power source 3 to apply to the coil 14 the first voltage by which the first terminal 31 becomes the positive electrode and the second terminal 32 becomes the negative electrode. The operation control part 421 releases the diaphragm spring 65 by moving the moving member 13 in the direction away from the clutch 6, and puts the clutch 6 into the connected state.

When the clutch 6 is in the connected state, the operation control part 421 inserts the holding member 17 into the second hole 182 (see FIG. 5) by moving the holding member 17 in a direction toward the moving member 13. By having the holding member 17 inserted in the second hole 182, the moving member 13 becomes unable to move in the direction of the rotation axis 5. As a result, the clutch 6 is kept in the connected state. When the holding member 17 has been inserted in the second hole 182, the operation control part 421 causes the power source 3 to stop applying the voltage to the coil 14.

The operation control part 421 pulls out the holding member 17 from the second hole 182 when switching the state of the clutch 6 from the connected state to the disconnected state. Specifically, the operation control part 421 pulls out the holding member 17 from the second hole 182 by controlling the actuator to move the holding member 17 inserted in the second hole 182 in the direction away from the moving member 13.

After pulling out the holding member 17 from the second hole 182, the operation control part 421 causes the power source 3 to apply a second voltage having the polarity opposite to the polarity of the first voltage to the coil 14. Specifically, the operation control part 421 causes the stator 12 and the moving member 13 to generate the Lorentz force that moves the stator 12 and the moving member 13 such that the clutch 6 is put into the disconnected state, by causing the power source 3 to apply to the coil 14 the second voltage by which the first terminal 31 becomes the negative electrode and the second terminal 32 becomes the positive electrode. More specifically, the operation control part 421 causes the stator 12 and the moving member 13 to generate the Lorentz force that moves the moving member 13 in a direction approaching the clutch 6 in the direction of the rotation axis 5. When the clutch 6 is in the disconnected state, the operation control part 421 inserts the holding member 17 into the first hole 181 by controlling the actuator. When the holding member 17 has been inserted in the first hole 181, the operation control part 421 causes the power source 3 to stop applying the voltage to the coil 14.

Since the holding member 17 holds (i) the moving member 13 that put the clutch 6 in the connected state or (ii) the moving member 13 that put the clutch 6 in the disconnected state, the operation control part 421 does not need to cause the power source 3 to continuously apply the voltage to the coil 14 in order to hold the moving member 13, and therefore power consumption can be reduced.

Modified Example 1

In the first and second embodiments, the clutch 6 is a diaphragm spring clutch, but it is not limited thereto, and may be any clutch. The clutch 6 may be any clutch, such as a coil spring friction clutch or a dog clutch, as long as it is a clutch that disables the transmission of power by moving in the direction of the rotation axis 5.

Modified Example 2

The operation control part 421 of the first embodiment puts the clutch 6 into the connected state by causing the power source 3 to apply the voltage to the coil 14, and puts the clutch 6 into the disconnected state by causing the power source 3 not to apply the voltage to the coil 14. The present disclosure is not limited thereto, and the operation control part 421 may put the clutch 6 into the disconnected state by causing the power source 3 to apply the voltage to the coil 14, and may put the clutch 6 into the connected state by causing the power source 3 not to apply any voltage to the coil 14. In this case, the elastic member 15 is a tension spring and puts the clutch 6 into the connected state by applying a force to the stator 12 and the moving member 13 in the direction of the rotation axis 5. The operation control part 421 causes the power source 3 to apply to the coil 14 a voltage by which the first terminal 31 becomes the negative electrode and the second terminal 32 becomes the positive electrode, thereby moving the stator 12 and the moving member 13 with a force which is greater than the force applied to the stator 12 and the moving member 13 by the elastic member 15, and thereby putting the clutch 6 into the disconnected state.

Modified Example 3

The power transmission system S may include both the elastic member 15 and the holding member 17. In this case, the moving member 13 includes a holding hole into which the holding member 17 is inserted. After switching the state of the clutch 6 by causing the power source 3 to apply the voltage to the coil 14, the operation control part 421 inserts the holding member 17 into the holding hole. By doing this, the operation control part 421 does not need to cause the power source 3 to continuously apply the voltage in order to maintain the connected state of the clutch 6, so that power consumption can be reduced.

Effect of the Power Transmission System S

As described above, by moving the stator 12 and the moving member 13 in the direction of the rotation axis 5 of the rotor 11, the power transmission system S can switch between the connected state and the disconnected state of the clutch 6, which interlocks with the movement of the moving member 13. Therefore, since the power transmission system S does not require a space necessary for rotating the shift lever, the power transmission system S can be downsized as compared with a configuration including a shift lever that operates a clutch.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A power transmission system comprising:
   a motor including a rotor and a stator provided outside the rotor;
   a clutch that disables transmission of power between the rotor and a power transmission member to which rotational force of the motor is transmitted; an operation control part that switches between (i) a connected state where the clutch transmits power and (ii) a disconnected state where the clutch does not transmit power, by moving the stator in a rotation axis direction of the rotor; and
   a coil used for moving the stator, wherein the operation control part switches the clutch between the connected state and the disconnected state by causing a power source to apply a voltage to the coil to move the stator in the rotation axis direction.

2. The power transmission system according to claim 1, further comprising:
   a moving member that is connected to the stator and movable in the rotation axis direction together with the stator; wherein
   the coil is wound around at least one of the stator or the moving member,
   the operation control part switches between the connected state and the disconnected state, by causing the power source to apply a voltage to the coil to move the stator in the rotation axis direction.

3. The power transmission system according to claim 2, wherein the stator has a cylindrical shape, and
   the moving member is provided outside the rotor on the same side as the clutch when viewed from the stator in the rotation axis direction, and has a cylindrical shape.

4. The power transmission system according to claim 2, further comprising:
   an elastic member that applies a force to the stator and the moving member in the rotation axis direction, wherein
   the operation control part switches between the connected state and the disconnected state, by causing the power source to apply a voltage to the coil to move the moving member with a force greater than the force applied to the stator by the elastic member.

5. The power transmission system according to claim 4, wherein
   the elastic member puts the clutch into the disconnected state by applying the force to the stator and the moving member in the rotation axis directions, and
   the operation control part puts the clutch into the connected state by causing the power source to apply a voltage to the coil to generate a force greater than the force applied to the stator and the moving member by the elastic member.

6. The power transmission system according to claim 5, wherein the elastic member has a plate to which a first end of the elastic member is connected, a second end, which is different from the first end, of the elastic member is connected to the stator,
   the plate is formed of permanent magnets,
   the moving member is formed of magnetic materials other than the permanent magnets, and
   by causing the power source to apply a voltage to the coil, the operation control part puts the clutch into the connected state by turning the moving member into an electromagnet that generates a magnetic adsorption force, by which the moving member is adsorbed to the plate, to generate a force greater than the force applied to the stator and the moving member by the elastic member and move the stator in the rotation axis direction.

7. The power transmission system according to claim 2, wherein the operation control part:
   generates a force to move the stator and the moving member such that the clutch is put into the connected state, by causing the power source to apply a first voltage to the coil, and generates a force to move the stator and the moving member such that the clutch is put into the disconnected state, by causing the power source to apply a second voltage having a polarity opposite to the polarity of the first voltage, to the coil.

8. The power transmission system according to claim 7, further comprising:

a holding member that holds the moving member that put the clutch in the connected state and the moving member that put the clutch in the disconnected state.

9. The power transmission system according to claim 2, wherein the clutch includes a clutch disc connected to the moving member, and a flywheel that rotates in conjunction with the clutch disc when the clutch disc comes into contact, due to friction, and the operation control part causes the power source to apply a voltage to the coil to put the clutch into the connected state in a case where a rotational speed difference between the rotational speed of the clutch disc and the rotational speed of the flywheel is equal to or less than a predetermined value.

* * * * *